(12) United States Patent
Fuller

(10) Patent No.: US 7,160,226 B2
(45) Date of Patent: Jan. 9, 2007

(54) CONTINUOUSLY VARIABLE TRANSMISSION AND METHOD OF OPERATION THEREOF

(75) Inventor: John William Edward Fuller, Preston (GB)

(73) Assignee: Torotrak (Development) Limited (GB)

( * ) Notice: Subject to any disclaimer, the term of this patent is extended or adjusted under 35 U.S.C. 154(b) by 147 days.

(21) Appl. No.: 10/489,139

(22) PCT Filed: Aug. 22, 2002

(86) PCT No.: PCT/GB02/03885

§ 371 (c)(1),
(2), (4) Date: Sep. 23, 2004

(87) PCT Pub. No.: WO03/021135

PCT Pub. Date: Mar. 13, 2003

(65) Prior Publication Data

US 2005/0043138 A1    Feb. 24, 2005

(30) Foreign Application Priority Data

Aug. 31, 2001  (EP) .................................. 01307445
Aug. 31, 2001  (GB) .................................. 0121069.9

(51) Int. Cl.
*B60W 10/02*  (2006.01)

(52) U.S. Cl. ........................................................ 477/39

(58) Field of Classification Search ............. 192/3.55, 192/3.58; 477/39, 50, 48, 49
See application file for complete search history.

(56) References Cited

U.S. PATENT DOCUMENTS

| | | | |
|---|---|---|---|
| 4,433,594 A * | 2/1984 | Smirl ........................ 475/206 |
| 4,665,773 A * | 5/1987 | Hiramatsu et al. ............. 477/39 |
| 4,674,613 A | 6/1987 | Sikorski |
| 5,042,325 A | 8/1991 | Nogami et al. |
| 5,064,036 A * | 11/1991 | Schneider ................ 192/103 F |
| 5,098,345 A * | 3/1992 | Van Vuuren .................... 474/8 |
| 5,672,132 A * | 9/1997 | Schwab ......................... 474/8 |
| 5,938,557 A | 8/1999 | Greenwood |
| 6,168,546 B1 * | 1/2001 | Loffler et al. ................ 477/109 |

(Continued)

FOREIGN PATENT DOCUMENTS

DE   199 03 554 A1   8/2000

(Continued)

OTHER PUBLICATIONS

International Search Report, Int'l Appl'n No. PCT/GB02/03885; filed Aug. 22, 2002, Applicant: Torotrak (Development) Ltd.

*Primary Examiner*—Dirk Wright
(74) *Attorney, Agent, or Firm*—Brooks Kushman P.C.

(57) ABSTRACT

A continuously variable transmission is disclosed comprising a transmission input, a transmission output, and a continuously variable ratio unit ("variator") arranged to be coupled between the transmission input (205) and output (240) by means of at least one clutch (230,250) thereby to enable transfer of drive between the input and the output at a continuously variable transmission ratio. The variator is connected to a hydraulic control circuit (50) and so subject to a hydraulic control pressure which is adjustable by the control circuit and is also influenced by changes in variator ratio. The variator is constructed and arranged such as to adjust its ratio to provide a variator reaction torque which corresponds to the control pressure. The transmission further comprising means (311,310) for adjusting the torque capacity of the clutch while it is engaged so that by controlling torque loading applied to the variator, the clutch influences the control pressure and the reaction torque.

29 Claims, 5 Drawing Sheets

U.S. PATENT DOCUMENTS

| | | |
|---|---|---|
| 6,412,617 B1 * | 7/2002 | Spijker et al. .............. 192/3.55 |
| 6,461,271 B1 * | 10/2002 | Nakano et al. ................ 477/39 |
| 6,659,253 B1 * | 12/2003 | Dominke et al. ........ 192/103 F |
| 6,702,086 B1 * | 3/2004 | Ries-Mueller et al. ... 192/103 F |

FOREIGN PATENT DOCUMENTS

| | | |
|---|---|---|
| EP | 0 315 596 A2 | 5/1989 |
| EP | 0 315 596 A3 | 5/1989 |
| EP | 0 331 522 A2 | 9/1989 |
| EP | 0 331 522 A3 | 9/1989 |
| EP | 0 458 435 A | 11/1991 |
| EP | 1 069 331 A1 | 1/2001 |
| WO | WO 97 40292 A | 10/1997 |

* cited by examiner

CONTINUOUSLY VARIABLE TRANSMISSION AND METHOD OF OPERATION THEREOF

BACKGROUND OF THE INVENTION

1. Field of the Invention

The present invention relates to continuously variable transmissions ("CVTs") and to methods of control thereof.

The invention is especially, but not exclusively, applicable to transmissions in motor vehicles.

2. Background Art

CVTs conventionally use some form of ratio varying unit ("variator") to provide the required continuous variation of transmission ratio, the variator being coupled between transmission input and output via gearing and one or more clutches. The present invention has been developed in connection with transmissions using variators of toroidal-race rolling-traction type but is potentially applicable to certain other types of variator.

In a variator drive is transmitted by frictional engagement between moving parts, these parts being biased into engagement with each other. Thus for example in the toroidal-race rolling-traction type variator drive-is transmitted from one rotating disc to another by a roller, or more typically a set of rollers, sandwiched between the discs. A biasing force is applied (eg by urging one disc toward the other, although the rollers themselves may instead be biased toward the discs) to create pressure between the roller and discs and so enable transmission of drive. In fact the rollers and discs are in this case separated by a thin film of "traction fluid" and the required friction is a result of shear in the film.

The torque which can be transmitted by the variator is limited inter alia as a function of the biasing force. Furthermore the biasing force is typically varied in operation since large forces are required when large torque is being handled, but to sustain such a large biasing force would reduce energy efficiency and component lifetime.

One of the long recognised requirements in designing a variator is ensuring that a mismatch does not arise between the biasing force and the torque being handled, since excessive torque loading on the variator, in relation to the biasing force, risks creating an unacceptable level of slip between the variator's moving components and consequent variator failure or damage.

SUMMARY OF THE INVENTION

So-called "torque controlled" variators are at some advantage in this regard since the variator reaction torque is automatically regulated. A comparison can usefully be made between "ratio controlled" variators and torque controlled variators. In the former a required variator drive ratio is determined, typically by an electronic controller, and a control signal input to the variator causes it to adopt this predetermined ratio. A torque controlled variator too must receive a control signal but in this case the actual variator ratio is not determined solely thereby. Instead the variator automatically adopts a ratio in which the control signal is balanced by the torques acting on the variator. Hence the control signal corresponds to a chosen balance of variator torques and not to a predetermined ratio.

This principle will be illustrated by reference to a variator 10 illustrated in FIG. 1. This variator is a full toroidal type variator and its general construction will be familiar to those skilled in the art. Two input discs 12,14 are mounted upon a drive shaft for rotation therewith and have respective part toroidal surfaces 18,20 facing toward corresponding part toroidal surfaces 22,24 of a central output disc 26 to define a pair of toroidal cavities. The output disc is journalled such as to be rotatable independently of the shaft 16. Drive from an engine or other prime mover, input via the shaft 16 and input discs 12,14, is transferred to the output disc 26 via a set of rollers disposed in the toroidal cavities. A single representative roller 28 is illustrated but typically three such rollers are provided in each cavity. The aforementioned biasing force to engage the rollers with the discs is provided in the form of an "end load" applied across the input discs by means of a hydraulic piston/cylinder arrangement 15 acting on one of the discs 14. Each roller is journalled in a respective carriage 30 which is itself coupled to a double-acting hydraulic actuator 32 whereby a controlled translational force is applied to the roller/carriage combination. As well as being capable of translational motion along a circle centred on the variator axis, the roller/carriage combination is able to rotate about a tilt axis determined by the positioning of the actuator 32 to change the "tilt angle" of the roller relative to the discs, thereby varying the variator drive ratio, as is well known to those skilled in the art. Note that the tilt axis does not lie precisely in a radial plane. Instead the tilt axis is angled to the radial plane, this angle being referred to as the "castor angle".

The above described arrangement results in torque control of the variator. The actuator 32 exerts an adjustable force on the roller. The two discs also exert respective forces on the roller. For equilibrium the force applied by the actuator along the tangential direction of motion of the roller must equal the so-called "reaction force" exerted on the roller by the discs. Any inequality between the actuator force and the reaction force is quickly cancelled out because it causes the roller to move along its circular path, resulting in a change in roller tilt angle and consequent change in variator ratio, until the roller reaches a position in which the two forces are once more in balance. Hence variator ratio is dependent not only on the actuator force but also on the torques on either side of the variator.

It is straightforward to show that the actuator force (or equivalently the reaction force) is proportional to the sum of the torques into and out of the variator. More generally stated, the control signal applied to the variator (the actuator force, or correspondingly the difference in two hydraulic pressures in the actuator 32) determines the sum of the torques into and out of the variator (the "reaction torque").

The actuator 32 is connected to a hydraulic circuit 50, illustrated in FIG. 1a, by means of which hydraulic fluid pressures in the actuator are adjustable to correspondingly adjust the reaction force. In the illustrated example the actuator is of double acting type, receiving two oppositely acting fluid pressures. FIG. 1 shows an actuator with a single piston. FIG. 1a differs slightly in showing actuators 32 which use two opposed pistons 52,54 in respective cylinders 56,58, although the function of the actuators is the same in both cases. The circuit 50 uses a pair of electronically controlled valves 60,62 to generate back pressure in a respective pair of fluid lines S1,S2, each of which is fed with a constant flow of fluid by a respective pump 64,66. Adjusting the valves adjusts the back pressure in the lines and hence the reaction force. The difference between the two line pressures determines the reaction force and hence serves as the aforementioned control signal for the variator. By using a "higher pressure wins valve" 68 to connect whichever of the two lines is at higher pressure through a line 70 to the end loading arrangement 15 of FIG. 1, the end load can be varied generally in sympathy with the reaction force Under steady state conditions the control signal—the hydraulic pressures—is thus determined by the states of the valves. However, when a change in torque balance at the variator causes a change in the variator ratio the hydraulic pressures and the reaction force are modified. For example, braking of a vehicle by the driver produces a change in the torque at the transmission output requiring a change in variator ratio and corresponding movement of the rollers 28 and their actuators 32. Fluid must flow into one side of the actuator and out of the other. This flow itself causes pressure changes in the hydraulic circuit opposing the required roller motion. That is, the control signal is influenced by the variator. The effect is to damp roller motion somewhat and in most operating conditions is beneficial, contributing to variator stability against oscillation. In fact constrictions or "orifices" may be incorporated in the circuit to increase this damping effect by restricting fluid flow.

Problems may arise, however, if the change in torque balance is very abrupt, eg in the event of an emergency stop of a vehicle. The very rapid deceleration of the transmission output needs to be matched by a correspondingly rapid change in transmission ratio but back pressures in the hydraulic circuit resist the required roller motion and may prevent the variator from adjusting with sufficient speed. The result can be a large transient torque loading across the variator (a "torque spike"). In this condition the variator reaction torque still closely follows the hydraulic pressures in the actuators 32. However the pressures are in this condition a function not only of the valve settings in the hydraulic circuit, but also of the rate of variator ratio change. A dramatic rise in the pressure difference across lines S1/S2 results, creating a correspondingly large variator reaction torque.

One danger of a torque spike is that if the transient response of the variator's biasing force (end load) is not matched to the increased torque then excessive slip in the variator can lead to its failure. If variator slip is avoided there remains the problem that an insufficient rate of change of variator ratio must, during an emergency stop, lead to a reduction in engine speed and so possibly to an engine stall.

Such difficulties are not experienced solely due to rapid braking. Consider for example the case of a vehicle which is initially stationary on an icy road surface and which then accelerates and moves onto a tarmac surface, as might occur where an icy minor road meets a gritted main road. To accelerate the vehicle the valves of the variator circuit are set to bias the rollers 28 in the appropriate direction and torque is applied to the wheels, causing them to spin on the ice. The torque required at the vehicle wheels is low and the transmission ratio correspondingly high. As the vehicle's driven wheels meet the tarmac however and achieve a firmer grip their speed is dramatically reduced. Larger wheel torque and a lower ratio are required and the adjustment is required rapidly. The setting of the valves however, based on the requirement for positive wheel torque, opposes the motion of the variator rollers 28 required to effect the adjustment and this condition could lead to slip within the variator.

The problems of variator response time and of matching the biasing force (end load) to the variator reaction torque are accentuated by the increase in viscosity of the variator's hydraulic fluid caused by low temperatures. Motor vehicles must operate acceptably in very cold conditions. Known variator designs use the same "traction fluid" for hydraulics and for transmission of torque at the roller/disc interface. Known traction fluids exhibit markedly increased viscosity at low temperatures. This can increase the back pressure produced in the hydraulics by changes in variator ratio (and so slow the variator's response) and also increase lag between changes in reaction torque and corresponding adjustment of biasing force (end load).

It has now been recognised that one or more of the above problems can be addressed by appropriate control of the transmission's clutch or clutches.

In accordance with a first aspect of the present invention there is a continuously variable transmission comprising a transmission input, a transmission output, and a continuously variable ratio unit ("variator") arranged to be coupled between the transmission input and output by means of at least one clutch thereby to enable transfer of drive between the input and the output at a continuously variable transmission ratio, wherein the variator is connected to a hydraulic control circuit and so subject to a hydraulic control pressure which is adjustable by the control circuit and is also influenced by changes in variator ratio, the variator being constructed and arranged such as to adjust its ratio to provide a variator reaction torque which corresponds to the control pressure, and the transmission further comprising means for adjusting the torque capacity of the clutch while it is engaged so that by controlling torque loading applied to the variator, the clutch influences the control pressure and the reaction torque.

The clutch's control is effective when the clutch is engaged but slipping.

The term "clutch" as used in this context refers to any arrangement which, through frictional engagement, causes the variator to be drivingly coupled to the transmission output. One could for example conceive arrangements embodying the present invention in which a brake applied to some element of a gear train carried out this function, and such arrangements are intended to fall within the scope of the present invention. Typical embodiments however utilise a conventional clutch having interleaved rotating plates between which torque is passed when the plates are brought together.

Preferably the transmission is provided with control electronics for setting the clutch torque capacity in dependence upon a torque demand. The clutch torque capacity is typically a function of certain additional variables, however.

The transmission torque demand is preferably determined based on a driver operated control, conventionally an accelerator pedal.

Preferably, the control electronics are connected to means for monitoring variator ratio and additionally take account thereof in setting the clutch torque capacity.

In a preferred embodiment, the transmission is operable in at least two different regimes and the control electronics additionally take account of transmission regime in setting the clutch torque capacity.

In a further preferred embodiment, the control electronics provide a control mode in which the clutch torque capacity is set at a level which exceeds that required to transmit the torque demanded from the transmission by a chosen margin.

In a further preferred embodiment the transmission comprises control electronics which establish a desired control pressure and set the control circuit in dependence thereupon, the control electronics also serving to adjust the clutch such that excursions of the control pressure from the desired level due to changes in variator loading are controlled by virtue of slipping of the clutch.

Preferably the electronics control the clutch in such a manner as to bring the control pressure back to the desired level along a controlled profile.

In accordance with a second aspect of the present invention there is a method of operating a continuously variable transmission comprising a transmission input, a transmission output, and a continuously variable ratio unit ("variator") arranged to be coupled between the transmission input and output by means of at least one clutch thereby to enable transfer of drive-between the input and the output at a continuously variable transmission ratio, the variator being connected to a hydraulic control circuit and being constructed and arranged such as to adjust its ratio to provide a variator reaction torque which corresponds to a control pressure from the control circuit, the method comprising controlling the control circuit to apply an adjustable hydraulic control pressure to the variator, the control pressure being also influenced by changes in variator ratio, and adjusting the torque capacity of the clutch while it is engaged so that by controlling torque loading applied to the variator, the clutch influences the control pressure and the reaction torque.

A further aspect of the present invention concerns the practical implementation of the required clutch control, particularly in transmissions of so-called multi-regime type.

It is well known to incorporate a variator in a CVT which is operable in two or more different regimes, thereby providing a range of transmission ratios larger than the range available from the variator itself. Purely by way of example, reference is directed to published international patent application PCT/GB97/00938 which describes a transmission having a low regime, in which the variator's output is led to an epicyclic mixer and modified therein, and a high regime in which the variator's output is led to the transmission output shaft through a fixed ratio gear chain.

In such a transmission the variator need not be disengaged from the wheels when the vehicle is stationary. Instead the epicyclic mixer is used to provide a "geared neutral" condition in which its output—and the vehicle wheels—are static despite rotation of the transmission input and the variator. The function of the aforementioned clutch (or clutches) is to engage one regime or another and to effect a change therebetween. It is important to effect regime changes smoothly and without mechanical shock. As is well known in the art, the required smooth change can be achieved by changing the clutch state when there is no relative motion across its elements (eg its interleaved clutch plates, in the conventional type of clutch). This is referred to as synchronous regime change. The required synchronous motion of the clutch occurs only briefly so achieving a smooth change requires accurate timing and control of the clutch state. The favoured approach is to effect clutch engagement rapidly by application of hydraulic fluid to the clutch at high pressure.

Hence there is a further problem in reconciling the requirements for (i) control of clutch torque capacity while the clutch is in a state of engagement and (ii) rapid change of clutch state from disengaged to engaged.

In accordance with a third aspect of the present invention, there is a hydraulic arrangement for controlling a clutch of a continuously variable transmission having a continuously variable ratio unit ("variator") which can be coupled to a transmission output through the clutch, the arrangement comprising first supply means for supplying hydraulic fluid at high pressure, second supply means for supplying hydraulic fluid at controlled pressure, and valve means for connecting the first supply means to the clutch to effect a change in clutch state from disengaged to engaged, for subsequently disconnecting the first supply means from the clutch, and for connecting the second supply means to the clutch to maintain the clutch in a state of engagement.

Preferably, the valve means comprises a first valve for switching between connection of the clutch to the first supply means and connection of the clutch to the second supply means.

The first valve may be controlled in dependence upon clutch fluid pressure.

In this way the valve is enabled to effect a controlled transition from the first to the second supply means.

More specifically, the first valve may be controlled in dependence upon opposing signals corresponding to clutch fluid pressure and to pressure from the second fluid supply.

In such an embodiment the valve is preferably controlled such as to switch from the first supply means to the second supply means before the clutch fluid pressure reaches the pressure from the second fluid supply.

Hence after fluid from the first supply means has rapidly filled the clutch, a smooth transition can be made to control of the clutch by the second supply means.

The first valve is preferably formed as a pilot controlled valve subject to opposing pressure signals from the clutch and from the second supply means.

In an especially preferred embodiment of the present invention, the valve means further comprises an electrically controlled valve which is connected in a path from the first supply means to the clutch and which, by opening this path, serves to initiate the change in clutch state from disengaged to engaged.

The electrically controlled valve may be a solenoid valve.

In such an embodiment, the electrically controlled valve may be in a path from the first valve to the clutch, the first valve being arranged to selectively connect one of the first supply means and the second supply means to the electrically controlled valve, and to rest, when the clutch is disengaged, in the state in which it connects the first supply means to the electrically controlled valve.

Hence the electrically controlled valve, by opening to flow from the first valve to the clutch, enables flow from the first supply means to the clutch to bring the clutch into a state of engagement. This arrangement allows rapid initiation of the flow required to fill the clutch, but this flow must pass through both valves.

In an alternative embodiment, the electrically controlled valve is arranged to initiate the change of clutch state by applying a pressure signal to the first valve to cause it to shuttle to open a path from the first supply means to the clutch.

DETAILED DESCRIPTION OF THE PREFERRED EMBODIMENTS

This embodiment has the advantage that the flow path from the first supply means to the clutch need only contain one valve—the first valve.

The required pressure signal is preferably taken from the second supply means. Still more preferably, the pressure signal is opposed by a further pressure signal taken from the clutch, such that as clutch pressure rises the first valve is caused to shuttle back to connect the clutch to the second supply means.

Adjustment of the fluid pressure applied to the clutch from the second supply means is preferably carried out in dependence upon transmission parameters. An electronic control unit ("ECU") preferably monitors the relevant parameters and sets the fuse pressure.

The effect is preferably to adjust the pressure from the second supply means in dependence upon torque demand. In a multi-regime transmission this may be achieved by controlling the pressure—and hence the clutch torque capacity—as a function of transmission regime, differential pressure upon a hydraulic variator actuator and variator ratio.

In a particularly preferred embodiment of the present invention, the system adjusts clutch torque capacity repeatedly while the clutch is engaged. Such repeated adjustment, implemented e.g under electronic control, may in effect be a continual process.

BRIEF DESCRIPTION OF THE DRAWINGS

A specific embodiment of the present invention will now be described, by way of example only, with reference to the accompanying drawings, in which:—

Figure 1:
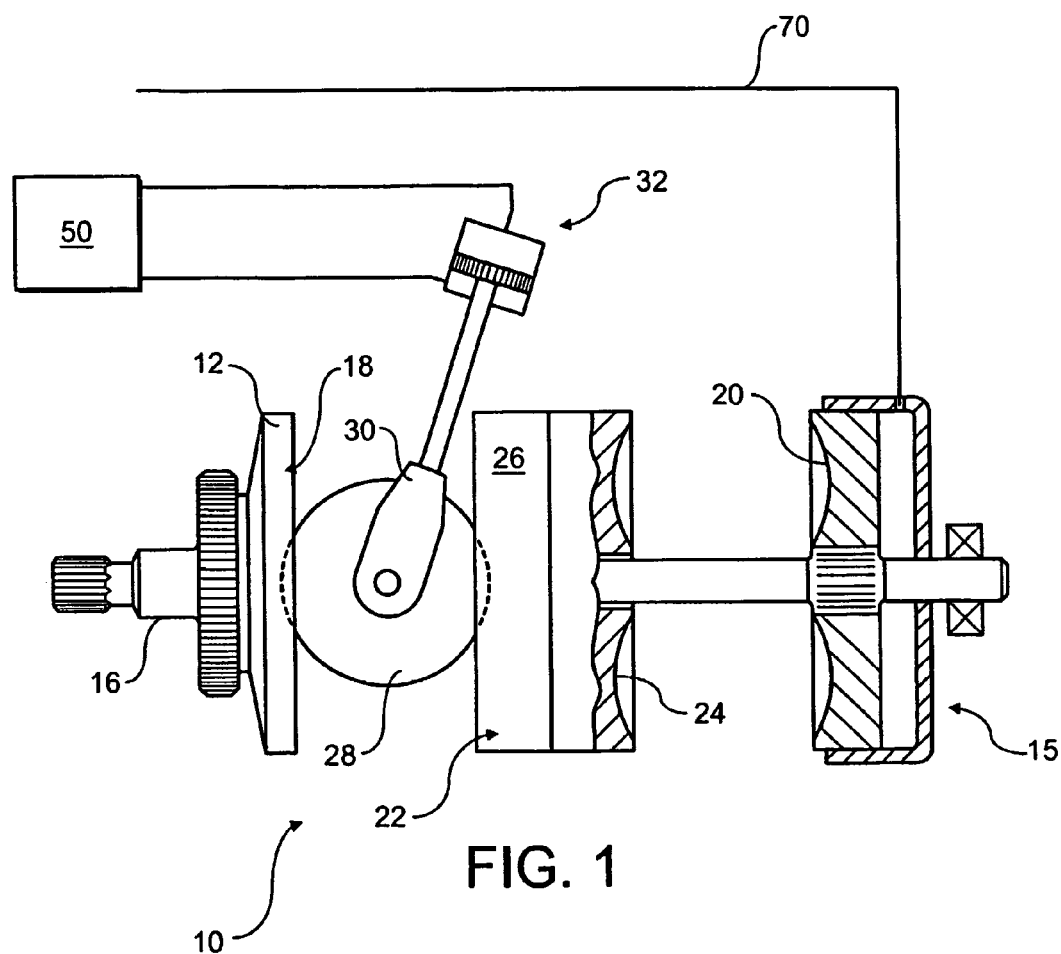
FIG. 1 is a simplified, partly sectional illustration of a toroidal-race rolling traction type variator which is known in itself and which can be incorporated in a transmission according to the present invention.
Figure 1A:
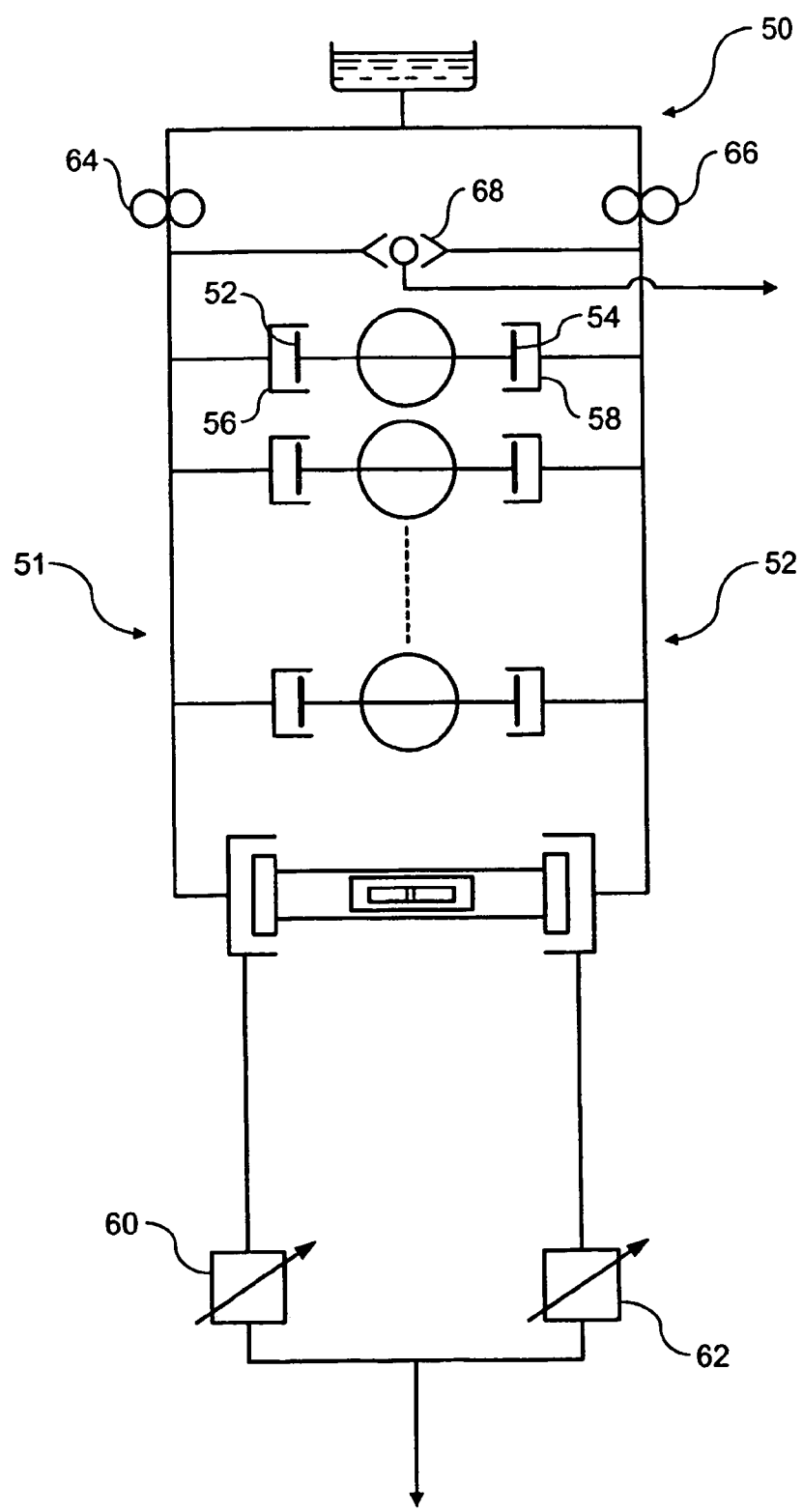
FIG. 1a is a diagram of a known hydraulic circuit for controlling the variator of FIG. 1.
Figure 2:
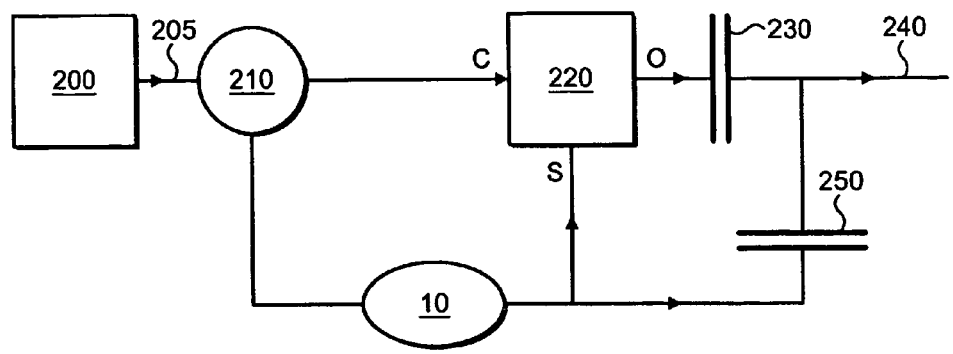
FIG. 2 is a symbolic representation of a transmission operable in accordance with the present invention.

The relationship of the variator 10 to other transmission components can be appreciated from FIG. 2. The illustrated transmission is operable in either high or low regime. An engine or other prime mover 200 drives, through an input shaft 205 and gearing 210, both the input side of the variator 10 and, as indicated at C, the carrier of an epicyclic mixer 220 (the construction of a suitable epicyclic mixer is well known to those skilled in the art and is not detailed here). The sun gear of the mixer is driven as indicated at S by the variator output. Hence the epicyclic mixer output O varies with the variator ratio but differs from it, providing the low regime of the transmission. Low regime is engaged by a clutch 230 which transmits the mixer output onward to the transmission output shaft 240. This is sometimes referred to as a "power recirculation" regime since power is circulated in a loop comprising the variator 10, gearing 210 and the epicyclic mixer 220. In high regime, the low regime clutch 230 is disengaged and the variator output is transmitted through a high regime clutch 250 to the output shaft 240, the epicyclic mixer being thereby circumvented.

It will be apparent that in either regime, slippage of the engaged clutch 230 or 250 causes de-coupling of the input and output shafts 200, 240 and in this way problems associated with torque spikes can be avoided.

Figure 3:
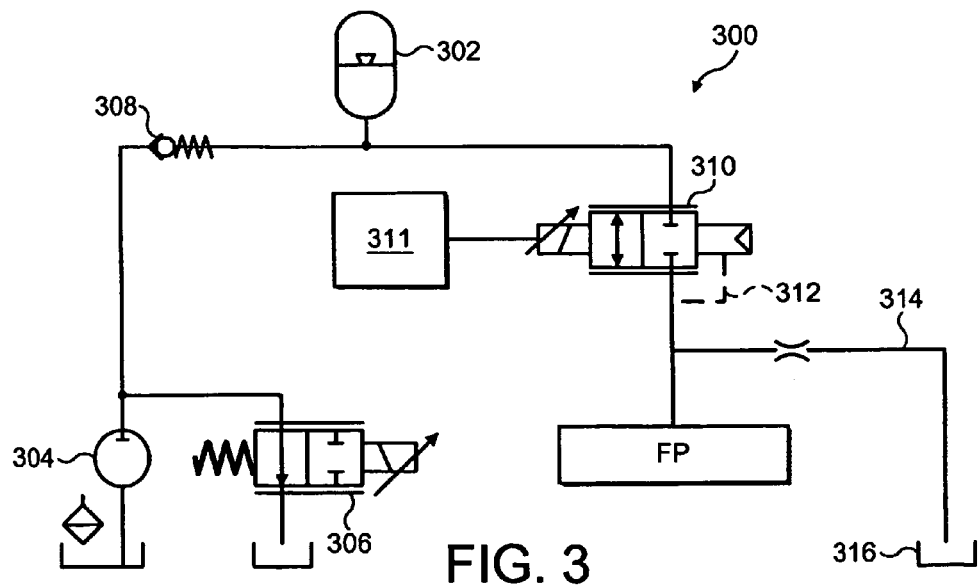
FIG. 3 is a diagram of a fuse pressure control circuit according to the present invention.

In the present embodiment the clutches are of conventional hydraulically actuated type and a circuit 300 serving as a supply means for producing a suitably controlled hydraulic pressure for application to the clutch while it is engaged, in order to allow slip to occur during torque spikes, is represented in FIG. 3. Here an accumulator 302 of conventional type having a resiliently variable volume is maintained at high pressure by means of a pump 304 and a relief valve 306 which opens to vent pump output when the required accumulator pressure is obtained. Other, more energy efficient, arrangements for achieving the required accumulator pressure will be known to those skilled in the art and could be utilized. The pump output is fed via a non-return valve 308 to the accumulator which is further connected to an input port of a pressure reducing valve 310, this valve's output port being the circuit's "fuse pressure" output FP. The term "fuse pressure" refers here to a controlled pressure for application to the clutch.

The pressure of the output is controlled by an electronic control unit (ECU) 311 which modulates a signal applied to a solenoid of the valve 310, the resulting force on the valve's spool being opposed by a pilot pressure signal taken as indicated at 312 from the valve's output. When the pressure determined by the solenoid signal is reached the force due to this pressure exceeds the solenoid force and the spool moves to close the valve 310 and hence isolate its output from the accumulator. A limited path for flow away from the valve's output must be provided in order to allow the pressure to fall when the valve 310 is shut and this is represented at 314 although in existing systems leakage back to the transmission's sump 316 provides sufficient flow.

Other than during regime changes, the fuse pressure output FP from the circuit 300 is applied to the engaged clutch 230 or 250 and is controlled by the ECU 311 to maintain a clutch engagement force determined by the ECU.

The ECU 311 receives inputs relating to various vehicle operating parameters and the fuse pressure can be set in response to a chosen combination of these. Using the ECU 311 to control the fuse pressure, it can be ensured that pressure spikes in the hydraulic variator control circuit due to torque spikes do not affect the fuse pressure, which could otherwise defeat the object.

Regime change involves engagement of one clutch and disengagement of the other. It is desired to achieve the change quickly during synchronous operation, as explained above, and the clutch fuse pressure is, in the current systems, inadequate to achieve the necessary rate of clutch engagement.

Figure 4:
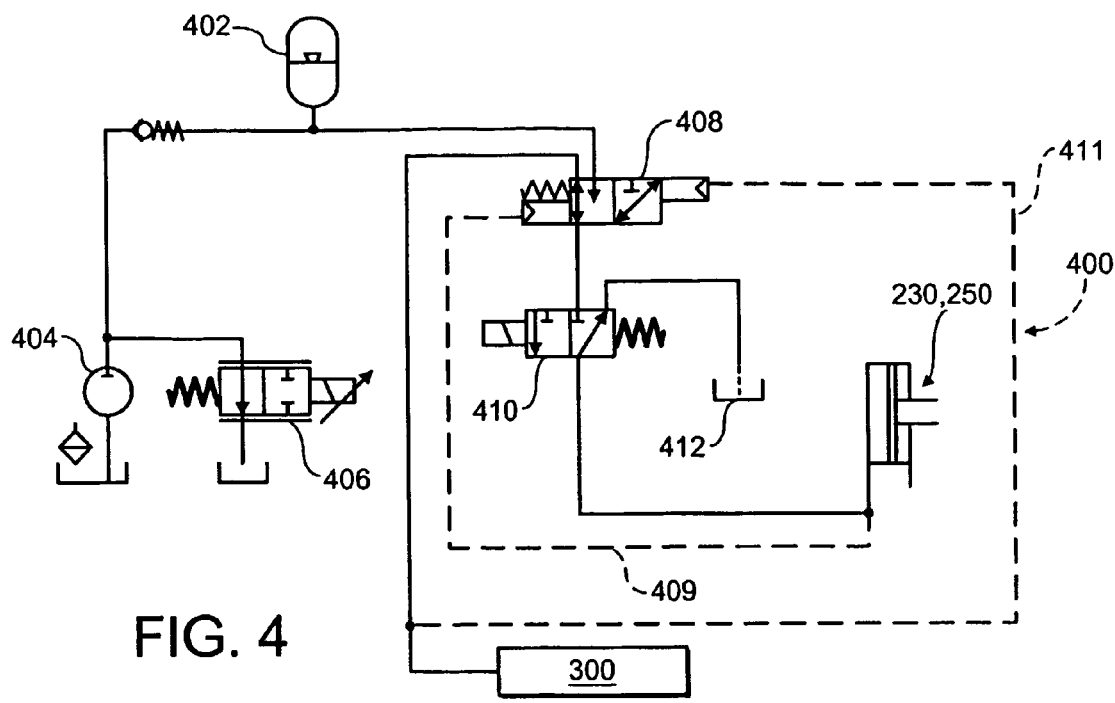
FIG. 4 is a diagram of a clutch control circuit according to the present invention.

FIG. 4 illustrates a hydraulic circuit 400 which overcomes this problem. A single clutch is shown in the figure for simplicity but it is to be understood that this could be either the low or high regime clutch 230, 250 depending on the regime change (high to low or vice versa). An accumulator 402 acts as a high pressure supply means, being maintained at high pressure by a pump 404 and associated relief valve 406. The fuse pressure circuit (illustrated in detail in FIG. 3) is here represented by box 300. A double pilot operated directional valve 408 serves to connect either the high pressure accumulator 402 or the fuse pressure circuit 300 to a three-port, two-position solenoid valve 410 hydraulically connected in its turn to the clutch 230, 250. Opposed pilot pressure signals are fed to the pilot operated valve 408 from the clutch and from the fuse pressure circuit 300 as indicated respectively at 409 and 411.

The circuit 400 operates as follows. With the solenoid valve 410 de-energized, it serves to connect the clutch directly to the sump 412, so that the clutch 230, 250 is disengaged. Fuse pressure acting on the spool of the pilot operated valve 408 through the line 411 is, while the clutch is disengaged and hence at atmospheric pressure, opposed only by the spring biasing acting on the spool. The force due to the fuse pressure dominates and the pilot operated valve 408 rests in a position in which it connects a closed port of the solenoid valve 410 to the accumulator 402. The solenoid valve 410 thus prevents flow from the accumulator.

When the solenoid valve 410 is energized to initiate clutch engagement, the high pressure accumulator rapidly charges the clutch as flow passes through both the pilot operated valve 408 and the solenoid valve 410. Clutch pressure rises rapidly, causing the clutch to engage rapidly, and when the clutch pressure overcomes the difference between the force due to the fuse pressure and the spring bias on the spool of the pilot operated valve 408, the spool shuttles to connect the clutch 230, 250 to the fuse pressure circuit 300. Due to the spring biasing this shuttling of the valve takes place before the clutch reaches the fuse pressure from the circuit 300. The clutch pressure is then increased to the fuse pressure, thereby increasing the force on the pilot operated valve spool and holding it in the fuse position, connecting the clutch to the fuse pressure circuit 300 as required, and the clutch thus remains engaged until the next regime change.

To disengage the clutch the solenoid valve 410 is de-energized, the clutch is consequently dumped to tank through valve 410 and the fuse pressure once again exceeds that in the clutch. The pilot operated valve thus returns to the position whereby the solenoid valve 410 is connected to the accumulator 402.

Advantages of this circuit include the fact that the clutch discharge path is through one valve only, making discharge rapid, and that the pilot operated valve 408 is already connected to the accumulator 402 when clutch charge is initiated and need shuttle only once during engagement. However, the clutch charge path, incorporating two valves, is restrictive and this could increase clutch fill time —that is, slow down the change of state of the clutch from disengaged to engaged.

Figure 5:
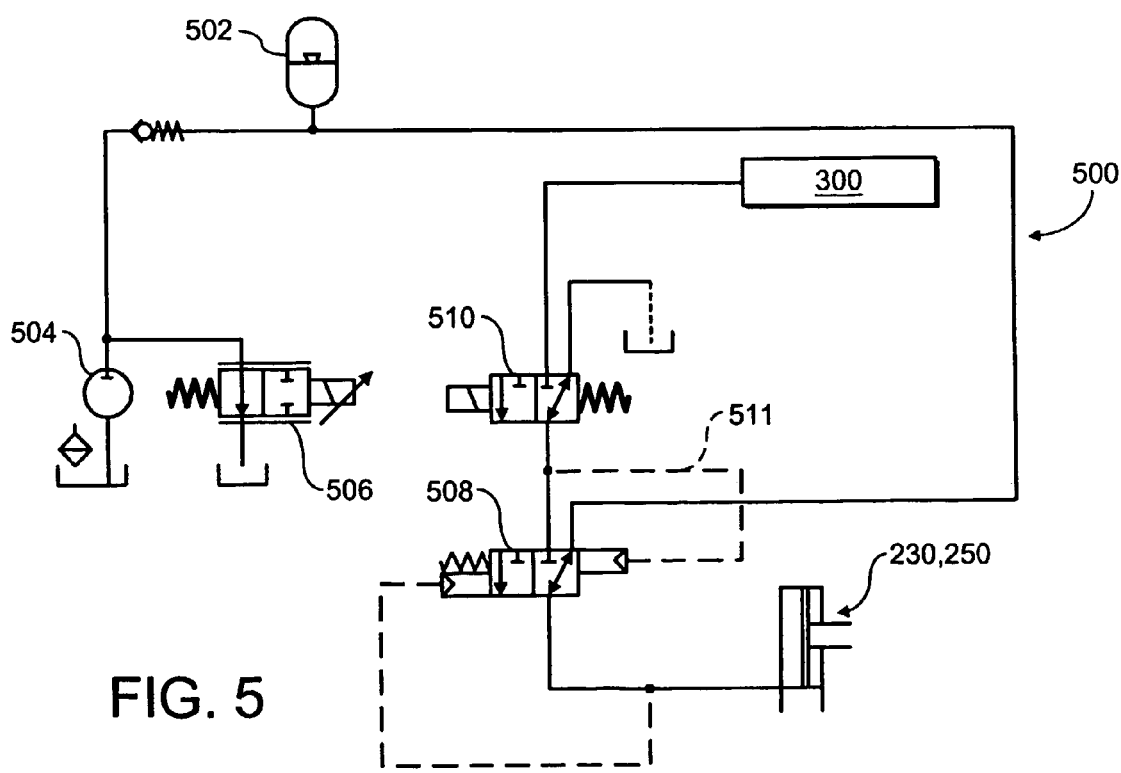
FIG. 5 is a diagram of a further clutch control circuit according to the present invention.

An alternative hydraulic circuit 500 is illustrated in FIG. 5. Again, an accumulator 502 is pressurized by a pump 504 and associated valve 506. A double pilot operated directional control valve 508 in this circuit controls a direct path 507 from the accumulator 502 to the clutch 230, 250 and also a path via a three-port, two position solenoid valve 510 to the fuse pressure circuit 300. To control the double pilot operated directional control valve, a first pilot pressure signal is taken, from a point in the circuit between the two valves 508,510, to the pilot operated valve 508 through a line 511. A second pilot pressure signal which opposes the first is taken from the clutch side of the pilot operated valve 508 through a line 509; this second pilot signal is at clutch fluid pressure. The circuit 500 operates as follows.

With the solenoid valve 510 de-energized, the fuse circuit 300 is isolated, and the double pilot operated directional control valve 508 rests in a position dictated by its spring bias in which it connects the solenoid valve 510 to the clutch 230, 250 and the clutch is led through the solenoid valve 510 to sump and is thus discharged and disengaged.

When the solenoid valve 510 is energized to initiate clutch engagement, fuse pressure is raised through a pilot passage 511 on one end of the pilot operated valve spool, moving it to the accumulator clutch charge position in which it connects the clutch 230,250 to the accumulator 502 through line 507. The accumulator 502 now charges the clutch 230, 250 as flow passes through the pilot operated valve 508 only. This presents a path of reduced restriction compared with the FIG. 4 circuit, and hence faster fill times may be achieved.

When the clutch pressure overcomes the difference between the force due to the fuse pressure and the spring bias on the spool of the pilot operated valve 508, this valve shuttles to connect the clutch 230, 250 directly to the fuse pressure circuit 300. The clutch pressure is then increased to the fuse pressure, thereby increasing the force on the pilot operated valve 508 spool and holding it in the fuse position.

When the clutch is to be once more disengaged, the solenoid valve 510 is de-energized. The pilot operated valve 508 remains in the same position and the clutch is once more connected via the solenoid valve 510 to the sump.

In the FIG. 5 circuit, the clutch charge path is through one valve only and the pilot operated valve 508 typically has a much greater opening than a solenoid valve, so fill time may be improved as compared with the FIG. 4 circuit. The pilot operated valve 508 has to shuttle to the accumulator feed and back in order to fill the clutch, which causes some delay. However, this valve is likely to be faster than a similar sized solenoid valve. However, the discharge path involves two valves rather than one. Therefore the discharge time may be longer than that achieved using the FIG. 4 circuit.

An alternative to the circuits illustrated in FIGS. 4 and 5 is to utilise the type of circuit illustrated in FIG. 3 to control the clutch pressure throughout and to provide initially high pressure to effect rapid clutch engagement by appropriate software control of the valve 310.

Controlling the clutch pressure, and consequently its torque capacity, allows great flexibility in the transmission operation. The clutch in effect provides a second tier of transmission torque control. Furthermore, as will be explained below, the clutch can be used to control the variator control signal—ie the control pressures applied to the variator actuators 32.

In the present embodiment the fuse pressure, and hence the torque transmitting capacity of the engaged clutch, are controlled as a function of (1) a torque demand, (2) variator ratio and (3) transmission regime.

Figure 6:
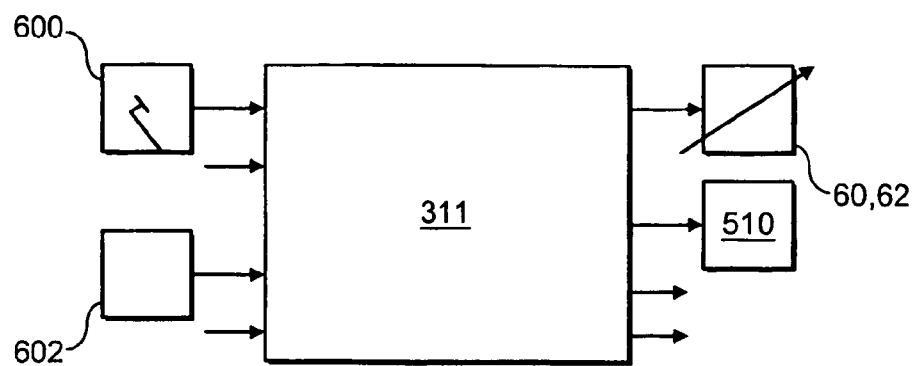
FIG. 6 shows in schematic form certain inputs to an electronic control unit of a transmission according to the present invention.

The torque demand is determined by the ECU 311 which, as FIG. 6 shows in highly schematic form, receives inputs relating to various operating parameters including in the illustrated example the position of a driver operated accelerator pedal 600 and the variator ratio 602 (which may be directly sensed or inferred from other measured quantities, eg from engine speed, transmission regime and wheel speed). The ECU 311 also sends control outputs to eg the valves 60,62 in hydraulic lines S1,S2 and the above described valve arrangements such as 500 controlling transmission regime.

The ECU 311 establishes a demand for the variator reaction torque. This is part of the overall strategy for control of engine and transmission. The ECU typically interprets the position of pedal 600 as a requirement for torque at the driven wheels and, taking account of various operating parameters, controls both engine and transmission in such a manner as to provide the required wheel torque in an efficient manner. The principal control signal to the variator is the hydraulic pressures in lines S1,S2, corresponding to the variator reaction torque, and the valves 60,62 provide one means for the ECU 311 to adjust these pressures.

The torque demand corresponds to a certain level of torque to be transmitted by the engaged clutch 230,250. The relationship between torque across the engaged clutch and variator reaction torque is different in high and low regimes, a further factor for which the ECU 311 makes allowance.

Hence the ECU 311 can establish a level of torque which the engaged clutch is required to transmit. The currently preferred control strategy is to set the fuse pressure—and hence the clutch's torque capacity—above the required level by a chosen margin, eg 10 percent.

Hence while the torque across the clutch remains at or close to the requirement established by the ECU 311, the clutch does not slip. However if, as in the case of a torque spike due to sudden braking by the driver, torque across the engaged clutch rises above the required level then the clutch slips.

It should be noted that it is not necessary for the ECU 311 immediately to adjust clutch pressure in response to a torque spike. Instead, by maintaining the clutch constantly at a level just above that required to transmit the demanded torque, it ensures that the clutch is constantly ready to slip in response to a spike. The response can be said to be passive rather than active. This is advantageous because torque spikes typically occur more rapidly than the ECU and the hydraulics can respond. The passive response by the clutch can be instantaneous and so allows the system to react to the torque spikes with sufficient rapidity. An active response, reliant on detecting a torque spike and then making adjustments to the transmission in response, cannot be made quickly enough to protect against the spikes. Adjustment of the clutch is carried out in a loop and is in effect a quasi-continuous process.

The transmission is protected by the clutch from any excursions from the demanded variator torque. If a rate of ratio change occurs which generates excessive drive line torque, then the clutch will slip and limit the rate of variator ratio change.

Figure 7:
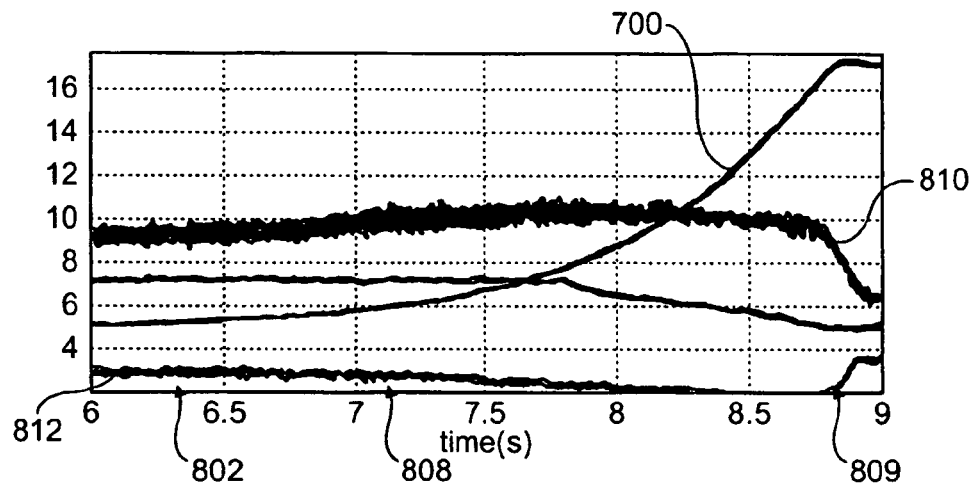
FIGS. 7 and 8 are graphs of experimental data, showing the variation of various operating parameters over time during a trial of a system embodying the present invention.
Figure 8:
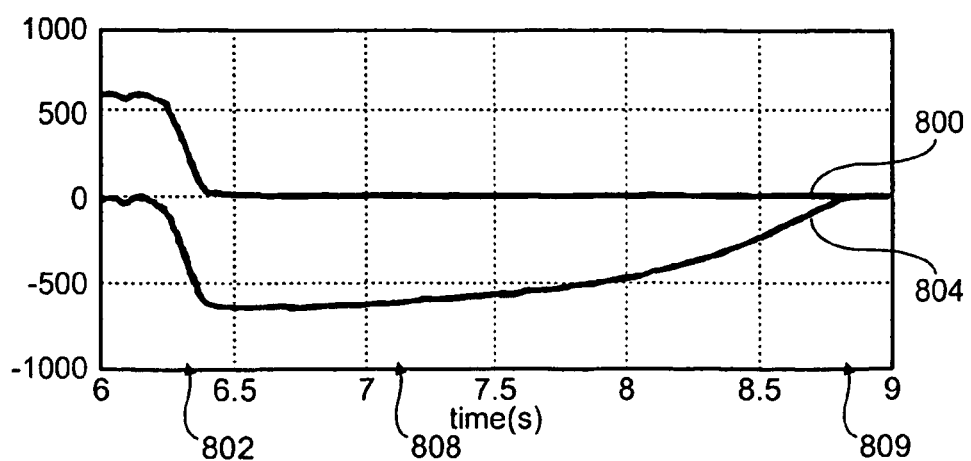

Control of the clutch torque capacity provides a secondary means of controlling both the variator reaction torque and the control pressures in lines S1 and S2. FIGS. 7 and 8 show experimental data exemplifying this point. In both, time in seconds is on the horizontal axis. The units of the vertical axis in FIG. 8 are rotations per minute. FIG. 7 shows several different quantities and the units on its vertical axis are arbitrary. Line 800 shows the speed of the transmission output which can be seen to start at roughly 600 rpm and to be locked—decelerated to a standstill—in about 0.1 seconds, as might occur in a vehicle when the driver locks the vehicle wheels by hard braking, at time 802. Line 804 represents clutch slip—ie the rate of rotation of one side of the clutch relative to the other. The clutch is subject in this trial to a regulated fuse pressure which begins at roughly 7.5 Bar. Consequently when the transmission output is locked, the clutch initially slips. One side of the clutch continues to rotate at 600 rpm while the other (on the transmission output side) is itself locked. By contrast the variator ratio, indicated by line 700, is not required to change instantaneously due to the slipping of the clutch. Additional loading on the variator due to locking of the output (which would, had the clutch not slipped, have required a very rapid change in variator ratio) is reduced by the clutch slip. What additional load the clutch does transmit to the variator causes it to gradually change its ratio, over a period of roughly two seconds in this example, to match the transmission's input and output speeds. In this period 808, as the variator "catches up", the clutch slip gradually diminishes. At time 809 the variator has reached a ratio corresponding to geared neutral, whereupon clutch slip ceases.

Lines 810 and 812 represent pressures in lines S1 and S2. If the clutch had not slipped, the rapid change of ratio upon locking of the transmission output would have produced an extreme and rapid change in these pressures. However pressures are here controlled by the clutch, and consequently do not change perceptibly at time 802. In this respect the example is a little unusual. Some change of pressures would typically be expected, its magnitude being dependent on the margin between the torque demand (corresponding to the initial pressures in S1 and S2, as set by the valves 60,62) and the clutch torque capacity.

Once the clutch begins to slip, the torque loading it passes on to the variator is equal to the clutch torque capacity. The variator is therefore isolated from disturbances at the transmission output. Clutch torque capacity then directly influences the rate of change of variator ratio and therefore the difference between demanded and actual variator control pressures.

The mode of control by the clutch can be explained as follows i. Between times 802 and 809 the torque capacity of the slipping clutch determines the torque applied at the variator output;

ii. this applied torque causes a shift in variator ratio with an associated motion of the variator rollers and their pistons 52, 54;

iii. the resulting change in flow rate at the valves 60, 62 produces a change in the pressures acting on the pistons 52, 54 and a resultant change in variator reaction torque;

iv. creating an output torque in opposition to the torque applied by the clutch;

v. which determines the rte at which the variator ratio adjusts to match the sudden deceleration of the transmission output.

The change dP to the S1/S2 pressure differential is not only a function of the torque applied by the clutch but depends also on variator ratio. The reaction torque—and the corresponding S1/S2 pressure difference—produced by a given output torque (clutch torque) varies with variator ratio. As the variator ratio reduces, the variator's resistance to ratio changes caused by the clutch increases. To put this another way, variator output torque increases as the ratio reduces, for a given reaction torque. Consequently a greater clutch capacity is required at lower variator ratio, for a given reaction torque.

Hence in order to accurately regulate dP it is necessary to control the clutch torque capacity as a function of an additional variable—variator ratio. Line 814 represents clutch pressure which can be seen to change as the variator ratio changes. It is also necessary for the adjustment of clutch capacity to be carried out sufficiently quickly to accommodate changes in variator ratio. This is achievable since the rate of change of the variator ratio is itself controlled by the clutch capacity and so can be kept within acceptable limits.

Because changes in variator loading are prevented from creating large changes in S1/S2 differential pressure (and correspondingly large changes in variator reaction torque) the aforementioned problem of mismatch between end load and variator reaction torque are avoided, even at low fluid temperatures, as at start up in a cold climate. In such conditions the clutch torque capacity may in fact be set at a level permitting constant clutch slip, the clutch rather than the variator being in this start up period the primary determinant of output torque.

It will be understood that the present invention creates numerous possibilities, the above described embodiments serving only as examples and the scope of the invention being determined by the appended claims.

The invention claimed is:

1. A continuously variable transmission comprising a transmission input, a transmission output, and a continuously variable ratio unit arranged to be coupled between the transmission input and output by means of at least one clutch thereby to enable transfer of drive between the input and the output at a continuously variable transmission ratio, wherein the variator is connected to a hydraulic control circuit and so subject to a hydraulic control pressure which is adjustable by the control circuit and is also influenced by changes in variator ratio, the variator being constructed and arranged such as to adjust its ratio to provide a variator reaction torque which corresponds to the control pressure, the transmission being characterised by provision of means for adjusting the torque capacity of the clutch while it is engaged, the transmission further comprising control electronics which establish a desired control pressure and set the control circuit in dependence thereupon, the control electronics also serving to adjust the torque capacity of the clutch while the clutch is engaged such that excursions of the control pressure from the desired level due to changes in variator loading are controlled by virtue of slipping of the clutch.

2. A continuously variable transmission as claimed in claim 1, wherein the control electronics set the clutch torque capacity in dependence upon a transmission torque demand.

3. A continuously variable transmission as claimed in claim 2 for use in a motor vehicle wherein the control electronics are connected to a driver operated control and calculate the transmission torque demand in dependence upon a signal therefrom.

4. A continuously variable transmission as claimed in claim 2, wherein the control electronics are connected to means for monitoring variator ratio and additionally take account thereof in setting the clutch torque capacity.

5. A continuously variable transmission as claimed in claim 1 which is operable in at least two different regimes, wherein the control electronics additionally take account of transmission regime in setting the clutch torque capacity.

6. A continuously variable transmission as claimed in claim 2, wherein the control electronics provide a control mode in which the clutch torque capacity is set at a level which exceeds that required to transmit the torque demanded from the transmission by a chosen margin.

7. A continuously variable transmission as claimed in claim 1, wherein the electronics control the clutch in such a manner as to maintain the control pressure on a desired control profile.

8. A method of operating a continuously variable transmission comprising a transmission input, a transmission output, and a continuously variable ratio unit arranged to be coupled between the transmission input and output by means of least one clutch thereby to enable transfer of drive between the input and the output at a continuously variable transmission ratio, the variator being connected to a hydraulic control circuit and being constructed and arranged such as to adjust its ratio to provide a variator reaction torque which corresponds to a control pressure from the control circuit, the method being characterised in that it comprises establishing a desired control pressure and setting the control circuit in dependence thereupon, the control pressure being also influenced by changes in variator ratio, and adjusting the torque capacity of the clutch while it is engaged such that excursions of the control pressure from the desired level due to changes in variator loading are controlled by virtue of slipping of the clutch.

9. A method as claimed in claim 8 comprising setting the clutch torque capacity in dependence upon a transmission torque demand.

10. A method as claimed in claim 9, wherein the transmission is for a motor vehicle, the method comprising calculating the transmission torque demand in dependence upon a signal from a driver operated control.

11. A method as claimed in claim 8 comprising monitoring variator ratio and additionally taking account thereof in setting the clutch torque capacity.

12. A method as claimed in claim 8, wherein the transmission is operable in at least two different regimes, the method comprising additionally taking account of transmission regime in setting the clutch torque capacity.

13. A method as claimed in claim 8 in which for at least some of the time the clutch torque capacity is set at a level which exceeds that required to transmit the torque demanded from the transmission by a chosen margin.

14. A method as claimed in claim 8 comprising controlling the clutch in such a manner as to maintain the control pressure on a desired control profile.

15. A hydraulic arrangement for controlling a clutch of a continuously variable transmission having a continuously variable ratio unit which can be coupled to a transmission output through the clutch, the arrangement comprising first supply means for supplying hydraulic fluid at high pressure, second supply means for supplying hydraulic fluid at controlled pressure, and being characterised by provision of a valve arrangement controlling connection of the first and second supply means to the clutch, the valve arrangement receiving opposed pilot pressure signals from connections to the clutch and to the second supply means and being arranged to effect engagement of the clutch by connecting the high pressure supply means to the clutch, to subsequently disconnect the first supply means from the clutch when the pilot pressure signal from the clutch overcomes the pilot pressure signal from the second supply means, and to connect the second supply means to the clutch to maintain the clutch in its engaged state.

16. A hydraulic arrangement as claimed in claim 15, wherein the valve arrangement comprises a first valve for switching between connection of the clutch to the first supply means and connection of the clutch to the second supply means, the first valve receiving the opposed pilot pressure signals.

17. A hydraulic arrangement as claimed in claim 15, wherein the first valve is controlled such as to switch from the first fluid supply means to the second fluid supply means before the clutch fluid pressure reaches the pressure from the second fluid supply means.

18. A hydraulic arrangement as claimed in claim 15, wherein the valve arrangement further comprises an electrically controlled valve which is connected in a path from the first supply means to the clutch and which, by opening this path, serves to initiate the change in clutch state from disengaged to engaged.

19. A hydraulic arrangement as claimed in claim 18, wherein the electrically controlled valve is in a path from the first valve to the clutch, the first valve being arranged to selectively connect one of the first supply means and the second supply means to the electrically controlled valve, and to rest, when the clutch is disengaged, in the state in which it connects the first supply means to the electrically controlled valve.

20. A hydraulic arrangement as claimed in claim 18, wherein the electrically controlled valve is arranged to initiate the change of clutch state by applying a pressure signal to the first valve to cause it to shuttle to open a path from the first supply means to the clutch.

21. A hydraulic arrangement as claimed in claim 20, wherein the aforesaid pressure signal is taken from the second supply means.

22. A hydraulic arrangement as claimed in claim 19, wherein the aforesaid pressure signal is opposed by a further pressure signal taken from the clutch, such that as clutch pressure rises the first valve is caused to shuttle back to connect the clutch to the second supply means.

23. A hydraulic arrangement as claimed in claim 18, wherein the electrically controlled valve is a three port, two position valve which in one of its positions connects the clutch to drain to cause it to disengage.

24. A hydraulic arrangement as claimed in claim 15, wherein pressure from the second supply means is controlled while the clutch is in a state of engagement in dependence upon transmission operating parameters.

25. A hydraulic arrangement as claimed in claim 24, wherein pressure from the second supply means is controlled such as to allow clutch slip in the event of a transmission torque spike.

26. A hydraulic arrangement as claimed in claim 15, wherein pressure from the second supply means is adjusted such as to control clutch torque capacity in dependence upon transmission torque demand.

27. A hydraulic arrangement as claimed in claim 24 for a multi-regime transmission, wherein clutch torque capacity is controlled as a function of transmission regime, torque demand and variator ratio.

28. A hydraulic arrangement as claimed in claim 15, wherein the pressure from the second supply means is controlled by an electronic control unit.

29. A multi-regime transmission with gearing arranged, at a synchronous transmission ratio, to provide the same transmission ratio in any regime, the transmission comprising a hydraulic arrangement as claimed in claim 15 effecting a change of clutch state at a synchronous ratio.

* * * * *